United States Patent Office 3,641,232
Patented Feb. 8, 1972

3,641,232
PROCESS FOR MAKING MULTIFILAMENT YARNS
Wilhelmus J. Fontijn and Korstiaan J. M. van Drunen, Dieren, Netherlands, assignors to American Enka Corporation, Enka, N.C.
Original application Aug. 28, 1967, Ser. No. 663,812, now Patent No. 3,447,308, dated June 3, 1969. Divided and this application Sept. 27, 1968, Ser. No. 794,438
Int. Cl. B29f 3/10
U.S. Cl. 264—171          3 Claims

ABSTRACT OF THE DISCLOSURE

A process for the manufacture of yarn consisting of a plurality of composite filaments which comprises passing two incompatible polymers side-by-side to a common mixing zone, forming a laminated stream and splitting up the laminated stream in a plane transverse to the direction of the flow of the laminated stream at least once into separate substreams to form a single stream containing one polymer as a matrix and the other as a multiplicity of continuous ultrafine cores within the zone, passing the single stream to spinneret orifices and extruding a plurality of composite filaments containing the ultrafine cores extending longitudinally through the matrix.

---

This application is a division of application Ser. No. 663,812, filed Aug. 28, 1967, now Pat. No. 3,447,308.

The present invention relates to reinforcing materials for elastic articles and more particularly relates to a process and apparatus for making multifilament yarns made of composite filaments which when fabricated act as a reinforcement for tire carcasses.

Composite filaments, i.e., filaments composed of two or more incompatible synthetic linear high polymers as such, are known, e.g., two Du Pont patents, No. 2,936,482 and No. 2,987,797. These patents relate to bicomponent filaments in which the incompatible components are either in a core-sheath arrangement or are spun in a side-by-side relationship. In both cases, however, the liquid polymers are fed to the spinneret separately and maintained separate but contiguous in the final filament.

In U.S. application Ser. No. 368,028, filed May 18, 1964 now Pat. No. 3,369,057 there is disclosed a method for the preparation of composite filaments, that is, filaments containing an intimate mixture of two synthetic linear high polymers. In this system the different polymers are mixed either in the dry form, that is, as chips or powder, or, alternatively, one polymer is added to the other in the form of a concentrated dispersion. The mixture is melted and extruded to form a composite filament and one of the components is microfibrils of an average diameter of about 0.3 to 0.4 micron and an average length of 100 microns. From this it can be seen that the length of the fibrils is extremely small, namely, approximately 0.004". Therefore, such minute fibrils have no length to speak of and are certainly not continuous in any sense of the word. The product of U.S. patent 3,369,057 is known as Allied EF 121. As stated, when the two different polymers are intermingled prior to extrusion, a filament is formed having only minute fibrils within the other polymer and they are not continuous. Such a process cannot be employed to produce a large number of continuous cores per filament. It has been determined that such small fibrils result in a considerable loss of fatigue resistance which may be due to the ends of the fibrils cutting into the basic polymer. Another drawback in this type of spinning from a mixture of granulated or pulverized polymer is that the mixing of the two polymers at this stage can never be ideal. The composition of the filaments in cross section, therefore, varies considerably through the length of the filament which makes it impossible for the yarn to ever obtain the optimum mechanical properties necessary for the use thereof in carcass fabrics. This product, therefore, is deficient in several important properties when used as a reinforcement for automobile tires and the like. These deficiencies will be seen from a table appearing further on in the specification.

It is therefore an object of the present invention to provide a system for manufacturing carcass fabrics made from improved composite multifilament yarn which is so modified that the good properties thereof are maintained and particularly an improved resistance to fatigue is maintained when the fabric is subjected to a strongly varying load.

It is a further object of this invention to provide a process for producing such improved composite multifilament yarn.

According to this invention, the system consists of feeding two polymers separately until they reach a mixing device capable of forming the polymer into a strongly laminated stream which is subsequently fed to the spinning orifices in a spinneret plate. According to the invention, the laminae which are to form the cores are finely divided in that before being distributed over the spinning orifices and while the same direction of flow is maintained, the multi-laminated stream, in a plane transverse to the direction of the laminae flow, is temporarily split up at least once into substreams with transverse dimensions of the order of magnitude of the lamina thickness in situ. The critical part of the apparatus is the disposition of at least one gauze screen and preferably several immediately before the spinneret plate. The gauze screen has a mesh width of approximately 2 x $n$, where $n$ represents the thickness of the laminae at the gauzes of the core material formed in the process, which gauzes may, if necessary, be combined into a pack, at least one gauze of which has a relatively large mesh width.

It should be noted that the composition of these gauze screens is very critical. If the gauzes are too coarse or too small in number, then the filaments will continue to distinctly show a laminated structure. However, on the other hand, if the gauzes are too fine or too large in number, then it is found that in the case of several polymer combinations, the polymer is subject to unduly high degradation which causes spinning difficulties. However, with the use of the screen pack described above, an optimum fine distribution of the ultra-fine core material in the basic matrix is obtained.

Carcass fabrics as reinforcing material of elastic articles is used not only in tires, but in driving belts, conveyor belts, etc. The present invention relates to these carcass fabrics, although the reinforcement of automobile tires is considered the most important application thereof.

In order that the carcass fabrics satisfy the stringent requirements for these uses, they must have a uniform cross-sectional shape of the filaments throughout the length of the yarn, high strength of the filaments, a satisfactory adhesion to rubber, a low loss of strength with frequently varying loads on the yarn embedded in the rubber, and a high resistance to the phenomenon known in the trade as "flat-spotting." Flat-spotting manifests itself for a period of time when the automobile is in motion and at each revolution of the wheel there is produced a bump. This happens if the automobile is used after it has been idle for some time and the tires have become relatively cool. The extent to which flat-spotting of the tires occurs is dependent upon the material from which the carcass fabric is made. If the material chosen is entirely suitable, the flat-spotting in practice becomes negligible.

It has been found that tires provided with carcass fabrics made exclusively from polyamide filaments show a high degree of flat-spotting, whereas tires provided with carcass fabrics made exclusively from polyethylene terephthalate show only a very slight degree of flat-spotting. However, the yarns of the latter fabric show a less satisfactory adhesion to the rubber of the tire and special precautions have to be taken to prevent the carcass fabric from separating from the rubber.

The system according to the present invention overcomes to a large extent the foregoing deficiencies and will be more fully understood by reference to the accompanying drawings, wherein.

Figure 1:
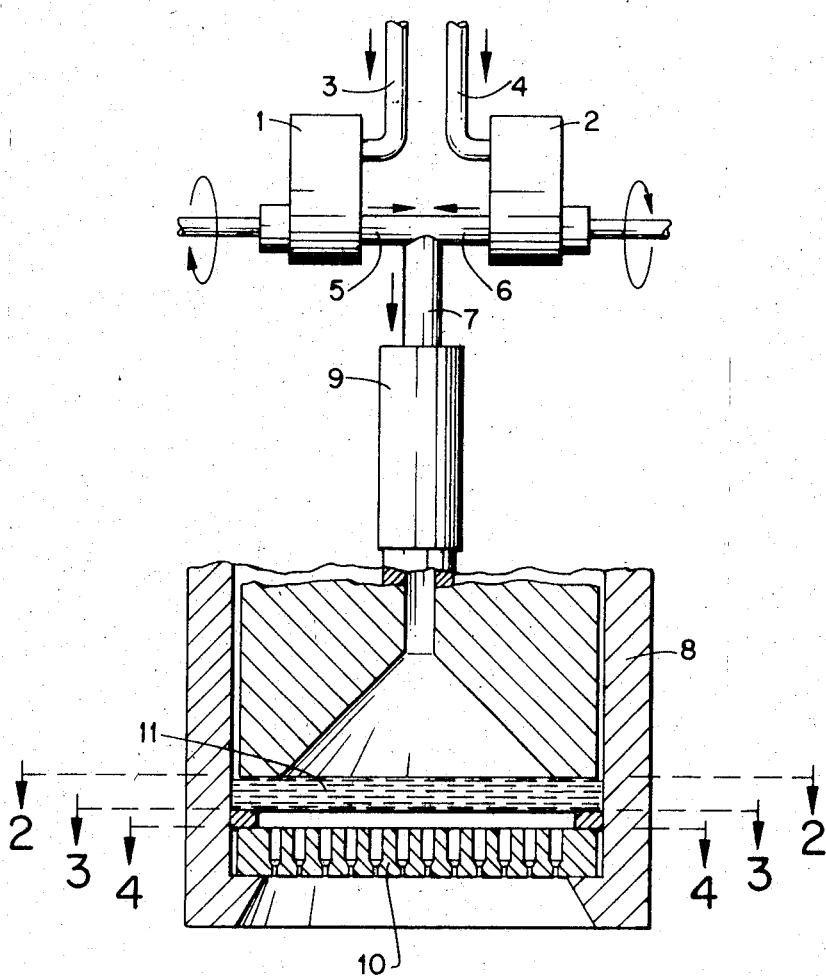
FIG. 1 shows a schematic arrangement of a spinning apparatus for carrying out the process of this invention with a longitudinal section through the spinning assembly.
Figure 3:
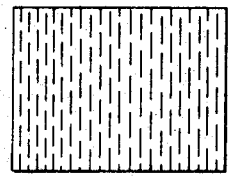
Figure 4:
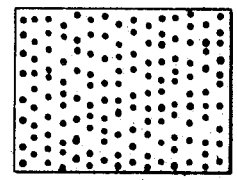

FIG. 3 is a schematic cross section through the polymer stream taken along the line 3—3 of FIG. 1; and FIG. 4 is a schematic cross section taken along line 4—4 of FIG. 1 which is through the polymer between line 3—3 and the spinneret plate.

FIG. 1 shows schematically a portion of a melt spinning apparatus in which numerals 1 and 2 designate two metering pumps that are driven in the directions indicated by the arrows. Two different spinning liquids are drawn between pumps 1 and 2 through feed conduits 3 and 4, respectively, and then are forced through conduits 5 and 6, respectively, which contain filters (not shown) with a fineness which is greater than that of the gauzes or screens more fully described below.

The conduits 5 and 6 debouch into a single main conduit 7 through which the two spinning liquids flow downwardly in side-by-side relationship. The main conduit 7 widens in section 9 in which there is provided a mixer (not shown) in which the number of layers of the two spinning liquids can be repeatedly doubled from 2 to over 1,000.

The mixer, which as stated is not shown, is of the type described in detail and claimed in U.S. Pat. No. 3,051,453, having common ownership herewith. The subject matter thereof is incorporated herein by reference.

Downstream of the mixer, the conduit 7 remains rectangular in cross section but diverges in a downward direcion. The conduit 7 debouches into the spinneret assembly 8 in which there is mounted a spinneret plate 10.

Positioned above the spinneret plate 10 is a combination of several gauzes 11 of the following composition: one gauze with 60 meshes per linear inch (60 mesh), two gauzes with 325 meshes per linear inch, one gauze with 60 meshes per linear inch. In the spinneret plate there are provided 140 spinning orifices.

Figure 2:
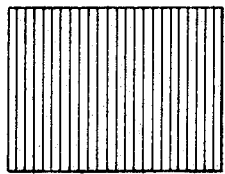
FIG. 2 is a schematic cross section taken along the line 2—2 of FIG. 1.

FIG. 2 is a schematic cross section of the laminated stream of the spinning liquid as it arrives at the combination of gauzes at line 2—2 of FIG. 1. The reason why the figures are denoted as schematic cross sections is because in reality there is a very much larger number of layers than can be shown in the drawing.

FIG. 3 shows the pattern of the laminated stream of the spinning liquid after it has passed the combination of the gauzes 11. While passing through the gauzes, the laminae are divided into separate streams which, under the influence of surface tension and viscous forces in the spinning liquid, do not reunite into contiguous layers after they pass through the gauzes but assume a substantially round cross section (see FIG. 4).

In this way, such a large number of separate streams of the spinning liquid forming the cores are obtained that about 150 cores can be counted in each filament. This fine subdivision does not lead to degradation of the polymers and, as will be shown hereinafter, the several properties of these multifilament yarns are far more favorable than when the laminae are not split up by the gauzes.

In a specific embodiment, a polyethylene terephthalate yarn with a relative viscosity of 1.6 and a nylon 6 polyamide having a relative viscosity of 2.9 are fed to spinning pumps 1 and 2. The polyamide-polyethylene terephthalate polymers are supplied in a weight ratio of 70:30. A yarn having a final denier of 840 was spun at a rate of 500 meters per minute and drawn in the usual way at a ratio of 5.3. Although the use of a very large number of cores (at least 100 per filament) results in a considerable improvement in the fatigue resistance, it has been found that if the choice of the transverse dimensions of cores is limited to a relatively narrow range, optimum properties are obtained. To this end, the cores must, according to the invention, measure less than 4 microns in cross section, and preferably less than 1 micron. These cores should be uniformly distributed throughout the longitudinal body of the matrix.

The properties of yarn A made according to the preceding paragraph and the properties of a similar yarn "B" consisting of nylon 66 and polyethylene terephthalate were compared with those of other commercially available tire yarns of synthetic polymers. Those yarns are a nylon 6 tire yarn marketed by Algemene Kunstzijde Unie N.V. under the trademark "Enkalon® type 100"; a nylon 6 tire yarn markeed by Allied Chemical Company under the trade name "Caprolan 4020"; a tire yarn marketed by Allied Chemical Company under the tradename "Allied EF–121" composed of nylon 6-polyethylene terephthalate in the weight ratio of 70:30; a yarn marketed by E. I. du Pont de Nemours under the trade name "N 44" (a yarn made from nylon 66 and polyhexamethylene-isophthalamide in the ratio of 80:20); a sheath-core yarn "C" with a nylon 6 sheath and a core of polyethylene terephthalate in the same weight ratio. All of these yarns were in the usual manner processed into tire yarn cord of which the following properties were determined: the "Goodyear tube fatigue," the temperature of the tube during this test in ° C., the "flat-spot index" expressed as percent extension in proportion to the extension of a standard sample, the cord strength, the resistance to heat of the yarn expressed as the percent residual strength relative to the original strength after the yarn has been treated for a given time at a particular temperature.

The results are shown in the following table.

TABLE

| Yarn type in the cord | Goodyear Tube Fatigue,* percent of control | Temp. during fatigue test in ° C. | "Flat spot Index" percent of control | Cord strength, g./den. | Heat stability, percent residual strength |
|---|---|---|---|---|---|
| Caprolan 4020 | "100" | 111 | 145 | 7.3 | 93 |
| Enkalon® type 100 | 73 | 113 | "100" | 7.4 | 90 |
| Allied EF–121 | 4 | 131 | 60 | 7.6 | 73 |
| Du Pont N 44 | 42 | 120 | 50 | 7.6 | 78 |
| "A" | 31 | 126 | 65 | 6.8 | 95 |
| "B" | 39 | 120 | 50 | 7.4 | 99 |
| "C" | 3 | 134 | 75 | 7.3 | 95 |
| "D" | 22 | 128 | 70 | 7.9 | 99 |

*The Goodyear Tube Fatigue Test is described in the ASTM Standards D 885—T 59, pp. 383–389. In accordance with this method, the tire cord is in a special way embedded in a tubular piece of rubber of standradized dimensions, after which the tube while internal pressure is maintained therein, is subjected to a standardized varying load. The time or number of loading cycles up to the moment the tube bursts or at least the internal pressure starts to decrease is considered a measure of the fatigue resistance. When the fatigue resistance of various cord materials is compared, this measure is for practical reasons often given as the ratio of the running time of the sample material to the running time of a standard material ×100%. This method of measuring aims at obtaining the closest possible approximation of the loading of a carcass fabric in an actual automobile tire.

It should be noted that a tire yarn receives a favorable rating if in combination:
 (a) The "Goodyear tube fatigue" has a high value;
 (b) The temperature during the fatigue test is low;
 (c) The "flat-spot index" is low;
 (d) The cord strength is high; and
 (e) The resistance to heat is high.

These data clearly show the improvement in flat-spot properties of yarns made according to the present invention relative to those of yarns made only of nylon 6.

These data finally show that a yarn made according to the present invention from the combination of nylon 66—polyethylene terephthalate on the whole has better properties than a yarn made from the combination of nylon 6—polyethylene terephthalate.

The carcass fabric now found shows this improved resistance to fatigue but moreover combines this with a more uniform cross-sectional shape of the filaments and a greater resemblance of this shape between the various filaments making up the carcass fabric. Surprisingly, it has also been found that in the manufacture of the carcass fabric according to the invention, it is possible to permit greater differences in viscosity of the two component polymers without adversely influencing the spinning process. As a result, the choice of polymers can be much wider.

The present invention consists in that the polymer, of which the dimensional stability when it is loaded is least dependent on the temperature when said polymer is in the solidified state, is present in a basic mass of the other polymer as at least 100 continuous cores which have cross-sectional dimensions that in all directions are of the same order of magnitude, and the cores together constitute 20 to 50% of the weight of the filaments.

Many combinations of polymers in the filaments are conceivable, of course. According to the invention, however, it is preferred to have the cores consist of polyethylene terephthalate having a relative viscosity of at least 1.5 and to choose for the basic material a polyamide, preferably polyhexamethylene-adipamide, having a relative viscosity of at least 2.3. The relative viscosity of the polyamide is determined at 25° C. on a solution of 1% of the polymer in a 90% formic acid concentration, and the relative viscosity of the polyester is also determined at 25° C., but on a solution of 1% of the polymer in m-cresol.

It is possible to further improve the multifilament yarn according to the invention if measures are taken that the peripheral zone of each filament is substantially free from endless cores. Thus, the risk of a small percentage of the cores that may consist of a polyester having a poor adhesion to rubber being positioned at the surface of the filaments, will be avoided. The thickness in the radial direction of such a core-free zone is preferably 5–10% of the half cross-section (=radious) of each filament.

What is claimed is:

1. A process for the manufacture of yarn consisting of a plurality of composite filaments which comprises pumping two incompatible synthetic linear high ploymers in side-by-side relationship to a common mixing zone downstream of the pumping zone wherein there is formed a laminated stream containing a plurality of layers of each polymer and, while the same direction of flow is maintained, the laminated stream is split up in a plane transverse to the direction of flow of the laminated stream at least once into separate substreams with transverse dimensions of the order of magnitude of the layer thickness in situ to form a single stream containing one polymer as a matrix and the other as a multiplicity of continuous ultrafine cores longitudinally extending throughout the matrix, passing said single stream directly to a plurality of spinneret orifices and extruding a plurality of said cores with said matrix through each of said spinneret orifices to form composite filaments containing a plurality of said ultrafine cores extending longitudinally throughout said matrix.

2. A process for producing a bicomponent polymeric fibrillary product consisting of a matrix of one polymer and a plurality of ultrafine cores of another polymer distributed throughout the matrix, comprising the steps of:

(a) combining into one stream a spinning mass containing a matrix-forming liquid polymeric component with a different spinning mass containing a core-forming polymeric component incompatible with the matrix-forming polymeric component, (b) laminating the polymeric components in said one stream to form a multi-laminated stream containing a plurality of laminae of each polymeric component, (c) finely dividing said laminated stream in a plane transverse to the flow of said laminae into a plurality of separate substreams, (d) reuniting said substreams, under the influence of surface tension and viscous forces acting on said substreams, into a mainstream having said polymeric components arranged in a uniform distribution pattern with a matrix of the matrix-forming polymeric component and a multiplicity of continuous ultrafine cores of the core-forming polymeric component within said matrix, (e) directly distributing said mainstream over a plurality of extrusion orifices, and (f) passing a plurality of said continuous ultrafine cores within said matrix through each of said extrusion orifices to form a fibrillary product having a plurality of said continuous ultrafine cores extending longitudinally throughout said matrix.

3. The process of claim 2 in which said matrix-forming liquid polymeric component comprises a polyamide having a relative viscosity of at least 2.3 and the core-forming polymeric component comprises polyethylene terephthalate having a relative viscosity of at least 1.5.

References Cited

UNITED STATES PATENTS

| | | | |
|---|---|---|---|
| 2,253,089 | 8/1941 | Nydegger | 264—176 F |
| 2,278,875 | 4/1942 | Graves | 264—176 F |
| 3,344,472 | 10/1967 | Kitajima et al. | 264—Bicomp. |
| 3,457,342 | 7/1969 | Parr et al. | 264—168 X |
| 3,447,308 | 6/1969 | Fontijin et al. | 57—153 X |
| 3,195,865 | 7/1965 | Hander | 259—4 |
| 3,485,912 | 12/1969 | Schrenk et al. | 264—171 |
| 3,295,552 | 1/1967 | Powell et al. | 264—171 |
| 3,505,162 | 4/1970 | Rasmussen | 161—177 |
| 3,511,742 | 5/1970 | Rasmussen | 161—109 |

FOREIGN PATENTS

| | | | |
|---|---|---|---|
| 760,179 | 10/1956 | Great Britain | 264—171 |
| 970,285 | 9/1964 | Great Britain | 264—176 F |
| 6,601,116 | 7/1967 | Netherlands | 264—Bicomp. |

JAL H. WOO, Primary Examiner

U.S. Cl. X.R.

161—175, 176; 264—174